US012142181B2

(12) United States Patent
Cha et al.

(10) Patent No.: US 12,142,181 B2
(45) Date of Patent: Nov. 12, 2024

(54) DISPLAY DEVICE NORMALIZING FOR EXTENDED USE AND METHOD FOR OPERATING THE SAME

(71) Applicant: SAMSUNG DISPLAY CO., LTD., Yongin-si (KR)

(72) Inventors: Ji-Won Cha, Yongin-si (KR); Jongjin Kim, Yongin-si (KR); Hyungtae Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 47 days.

(21) Appl. No.: 18/189,434

(22) Filed: Mar. 24, 2023

(65) Prior Publication Data

US 2023/0368716 A1 Nov. 16, 2023

(30) Foreign Application Priority Data

May 13, 2022 (KR) ........................ 10-2022-0058824

(51) Int. Cl.
*G09G 3/00* (2006.01)
*G09G 3/20* (2006.01)

(52) U.S. Cl.
CPC ......... *G09G 3/2007* (2013.01); *G09G 3/2096* (2013.01); *G09G 2320/045* (2013.01); *G09G 2320/0673* (2013.01); *G09G 2360/16* (2013.01)

(58) Field of Classification Search
CPC .. G09G 3/00; G09G 3/20; G09G 3/30; G09G 3/36; G09G 3/3208; G09G 3/3266;
(Continued)

(56) References Cited

U.S. PATENT DOCUMENTS 10,262,582 B2 4/2019 Han
2007/0057955 A1* 3/2007 Mckay .................... G09G 3/28
345/550

(Continued)

OTHER PUBLICATIONS

Kyongho Lim, et al., "Estimation and Evaluation of Image Sticking on OLED Device", vol. 44, Issue1, Jun. 2013, pp. 1162-1154.

(Continued)

*Primary Examiner* — Chanh D Nguyen
*Assistant Examiner* — Nguyen H Truong
(74) *Attorney, Agent, or Firm* — F. Chau & Associates, LLC

(57) ABSTRACT

A display device includes a driving controller configured to receive an input image signal and to output an output image signal, a data driving circuit configured to output a data signal to correspond to the output image signal, and a display panel including a plurality of pixels configured to display an image corresponding to the data signal. The driving controller includes a moving picture accumulator configured to receive the input image signal and to output an accumulation image signal obtained by accumulating the input image signal for an accumulating time, a moving picture average calculator configured to output an average image signal by dividing the accumulation image signal by the accumulating time, and a normalizer configured to output the output image signal by normalizing the average image signal, based on the maximum reference brightness of the display panel.

20 Claims, 9 Drawing Sheets

(58) Field of Classification Search
CPC ........... G09G 3/3291; G09G 2320/045; G09G 2320/0673; G09G 2360/16; G09G 5/00; G09G 5/10; G09G 5/36
See application file for complete search history.

(56) References Cited

U.S. PATENT DOCUMENTS

| | | | | |
|---|---|---|---|---|
| 2015/0116376 | A1* | 4/2015 | Kimura | G09G 3/3406 345/102 |
| 2021/0358427 | A1* | 11/2021 | Wang | G09G 5/10 |
| 2022/0343845 | A1* | 10/2022 | Wu | G09G 3/035 |

OTHER PUBLICATIONS

Young-Tae Choi, et al. , "A study on the method of OLED device's lifetime test", Proceedings of the Safety Management and Science Conference, pp. 131-143 / 2008.
Real-Life OLED Burn-In Test on 6 TVs. rtings.com, website <https://www.rtings.com/tv/learn/real-life-oled-burn-in-test>, 15 pages, originally published 2018, updated on Nov. 17, 2022, Accessed on Mar. 10, 2023.

* cited by examiner

FIG. 6A
FIG. 6B
ONE-ON-ONE WITH WH COUNSELOR KELLYANNE CONWAY

IMG1

IMG2

DISPLAY DEVICE NORMALIZING FOR EXTENDED USE AND METHOD FOR OPERATING THE SAME

CROSS-REFERENCE TO RELATED APPLICATIONS

This application claims priority under 35 U.S.C. § 119 to Korean Patent Application No. 10-2022-0058824 filed on May 13, 2022, in the Korean Intellectual Property Office, the disclosures of which are incorporated by reference herein in their entireties.

1. TECHNICAL FIELD

Embodiments of the present disclosure described herein relate to a display device and, more particularly, to a display device normalizing for extended use and a method of normalizing for extended use of a display.

2. DISCUSSION OF RELATED ART

An electronic device, such as a smart phone, a digital camera, a notebook computer, a navigation system, a computer monitor, and a smart television, that provide an image to a user, include a display device for displaying the image. The display device generates an image and provides the generated image to the user through a display screen.

The display device includes a plurality of pixels and driving circuits for controlling the plurality of pixels. Each of the plurality of pixels includes a light emitting device and a pixel circuit for controlling the light emitting device. The driving circuit of the pixel may include a plurality of transistors systematically connected to one another.

The display device may apply a data signal to a display panel. When a current corresponding to the data signal is supplied to the light emitting device, the display device may display an image represented by the data signal.

As the transistors constituting the pixels operate over time, the characteristics of the transistors may be changed.

SUMMARY

A display device includes a driving controller configured to receive an input image signal and to output an output image signal, a data driving circuit configured to output a data signal to correspond to the output image signal, and a display panel including a plurality of pixels configured to display an image corresponding to the data signal. The driving controller includes a moving picture accumulator configured to receive the input image signal and to output an accumulation image signal obtained by accumulating the input image signal for an accumulating time, a moving picture average calculator configured to output an average image signal by dividing the accumulation image signal by the accumulating time, and a normalizer configured to output the output image signal by normalizing the average image signal, based on the maximum reference brightness of the display panel.

The moving picture accumulator may be configured to accumulate the input image signal for each of the plurality of pixels and output the accumulation image signal for each of the plurality of pixels.

The moving picture average calculator may be configured to output the average image signal for each of the plurality of pixels.

The normalizer may be configured to calculate brightness, which corresponds to the average image signal, of each of the plurality of pixels, convert, to conversion brightness, the brightness of each of the plurality of pixels, based on the maximum reference brightness of the display panel, and convert the conversion brightness of each of the plurality of pixels to a grayscale level to output the output image signal.

The normalizer may be configured to set the conversion brightness of a pixel, which has the highest brightness, of the plurality of pixels to the maximum reference brightness, to calculate a brightness conversion ratio of the pixel, which has the highest brightness, of the plurality of pixels and convert, to the conversion brightness, the brightness of each of the plurality of pixels, by calculating the conversion brightness of the remaining pixels of the plurality of pixels, based on the brightness conversion ratio.

The brightness conversion ratio may be obtained by dividing the maximum reference brightness by the brightness of the pixel having the highest brightness.

The conversion brightness of the remaining pixels of the plurality of pixels may be obtained by multiplying the brightness of each of the remaining pixels by the brightness conversion ratio.

The normalizer may be configured to convert the conversion brightness of each of the plurality of pixels to the grayscale level, based on a 2.2 gamma curve.

The grayscale level of a pixel, which has the conversion brightness set to the maximum reference brightness, of the plurality of pixels may be '255'.

The moving picture accumulator may be configured to accumulate the input image signal for each of the plurality of pixels for 24 hours, and may be configured to output the accumulation image signal for the plurality of pixels.

The driving controller may be configured to output the output image signal, which is obtained, as the normalizer normalizes the average image signal based on the maximum reference brightness of the display panel, for a predetermined time.

A method for operating a display device includes receiving an input image signal and accumulating the input image signal for an accumulating time, outputting an average image signal by dividing the accumulation image signal by the accumulating time, and outputting an output image signal by normalizing the average image signal based on the maximum reference brightness of a display panel.

The display panel may include a plurality of pixels, and the accumulating of the input image signal may include accumulating the input image signal for each of the plurality of pixels, and outputting the accumulation image signal for each of the plurality of pixels.

The outputting of the average image signal may include outputting the average image signal for each of the plurality of pixels.

The outputting the output image signal may include calculating brightness, which corresponds to the average image signal, of each of the plurality of pixels, converting, to conversion brightness, the brightness of each of the plurality of pixels, based on the maximum reference brightness of the display panel, and converting the conversion brightness of each of the plurality of pixels to a grayscale level to output the output image signal.

The converting the brightness of each of the plurality of pixels to the conversion brightness may include setting the conversion brightness of a pixel, which has the highest brightness, of the plurality of pixels to the maximum reference brightness, calculating a brightness conversion ratio of the pixel, which has the highest brightness, of the plurality of pixels and calculating the conversion brightness of the remaining pixels of the plurality of pixels, based on the brightness conversion ratio.

The brightness conversion ratio may be obtained by dividing the maximum reference brightness by the brightness of the pixel having the highest brightness.

The conversion brightness of the remaining pixels of the plurality of pixels may be obtained by multiplying the brightness of each of the remaining pixels by the brightness conversion ratio.

The outputting of the output image signal may include converting the conversion brightness of each of the plurality of pixels to the grayscale level, based on a 2.2 gamma curve.

The accumulating of the input image signal may include accumulating the input image signal for each of the plurality of pixels for a period of 24 hours, and outputting the accumulation image signal for the plurality of pixels.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
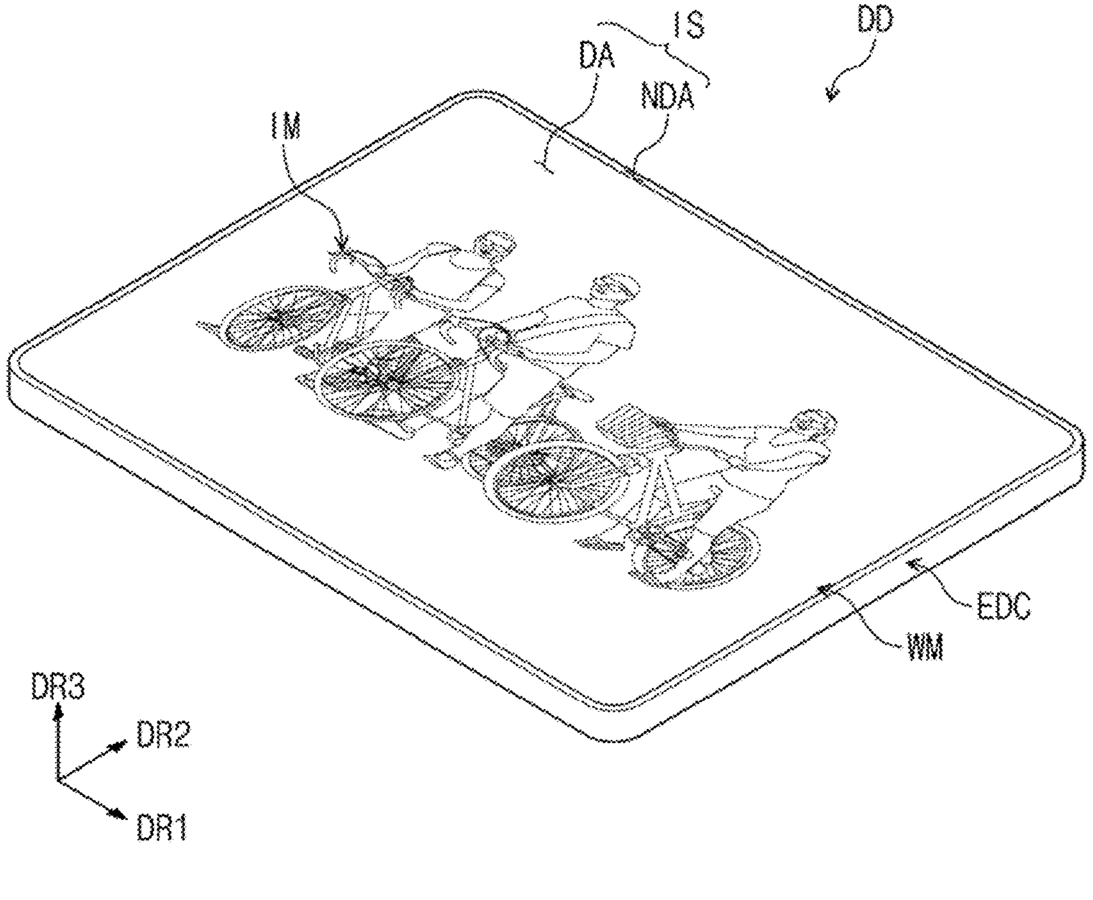
FIG. 1 is a perspective view of a display device, according to an embodiment of the present disclosure.

In the specification, the expression that a first component (or region, layer, part, portion, etc.) is "on", "connected to", or "coupled to" a second component means that the first component is directly on, connected to, or coupled to the second component or means that a third component is interposed therebetween.

The same reference numerals may refer to the same component throughout the specification and the drawings. The term "and/or" includes any and all combinations of one or more of associated components Although the terms "first", "second", etc. may be used to describe various components, the components should not necessarily be construed as being limited by the terms. The terms are used to distinguish one component from another component. For example, without departing from the scope and spirit of the present disclosure, a first component may be referred to as a second component, and similarly, the second component may be referred to as the first component. The singular forms are intended to include the plural forms unless the context clearly indicates otherwise.

In addition, the terms "under", "at a lower portion", "above", "an upper portion" are used to describe the relationship between components illustrated in drawings. The terms are relative and are described with reference to a direction indicated in the drawing.

It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

Hereinafter, embodiments of the present disclosure will be described with reference to accompanying drawings.

FIG. 1 is a perspective view of a display device, according to an embodiment of the present disclosure.

Referring to FIG. 1, a display device DD may be a device activated in response to an electrical signal. According to the present disclosure, the display device DD may include a small or medium-size display device, such as a cellular phone, a tablet computer, a laptop computer, a vehicle navigation, or a game console as well as a large-size display device, such as a television or a computer monitor. The above examples are provided for illustrative purpose, and the display device DD may be applied to other display device(s) without departing from the concept of the present disclosure.

The display device DD has a substantially rectangular shape having a pair of longer sides extending in a first direction DR1, and a pair of shorter sides extending in a second direction DR2 crossing the first direction DR1. However, the shape of the display device DD is not necessarily limited thereto, but various display devices DD having various shapes may be provided. The display device DD may display an image IM in a third direction DR3 on a display surface IS that extends on a plane defined by the first direction DR1 and the second direction DR2. The display surface IS may display the image IM on a front surface of the display device DD.

According to an embodiment, a front surface (or top surface) and a rear surface (or a bottom surface) of each of various members are defined based on a direction that the image IM is displayed in. The front surface and the rear surface are opposite to each other in the third direction DR3, and a normal direction to the front surface and the rear surface may be the third direction DR3.

The spacing between the front surface and the rear surface in the third direction DR3 may correspond to the thickness of the display device DD in the third direction DR3. The first direction DR1, the second direction DR2, and the third direction DR3 may be relative concepts and may be changed to different directions.

The display device DD may sense an external input. The external input may include various types of inputs that are provided from beyond the display device DD. According to an embodiment of the present disclosure, the display device DD may sense an external input of the user. The external input of the user may include any one of various external inputs, such as a part of a body of the user, light, heat, a gaze, or pressure, or a combination thereof. In addition, the display device DD may sense the external input of the user, which is applied to the side surface or the back surface of the display device DD depending on the structures of the display device DD, and is not necessarily limited to any one embodiment. For example, according to an embodiment of the present disclosure, the external input may include an input made by an input device (e.g., a stylus pen, an active pen, a touch pen, an electronic pen, or an e-pen).

The display surface IS of the display device DD may be divided into a display area DA and a non-display area NDA. The display area DA may be an area for displaying the image IM. A user views the image IM through the display area DA. According to the present embodiment, the display area DA is illustrated as a substantially rectangular shape rounded in vertexes (e.g., a rectangle with rounded corners). However, the shape is provided for illustrative purposes. For example, the display area DA may have various shapes, and not necessarily limited to any one embodiment.

The non-display area NDA may be adjacent to the display area DA. The non-display area NDA may have a specific color (e.g., the non-display area NDA may be covered by a black bezel). The non-display area NDA may at least partially surround the display area DA. The shape of the display area DA may be defined by the non-display area NDA. However, the above shape of the display area DA is provided for illustrative purposes. For example, the non-display area NDA may be adjacent to only one side of the display area DA or may be omitted. According to an embodiment of the present disclosure, the display device DD may include various embodiments, and is not necessarily limited to any one embodiment.

Figure 2:
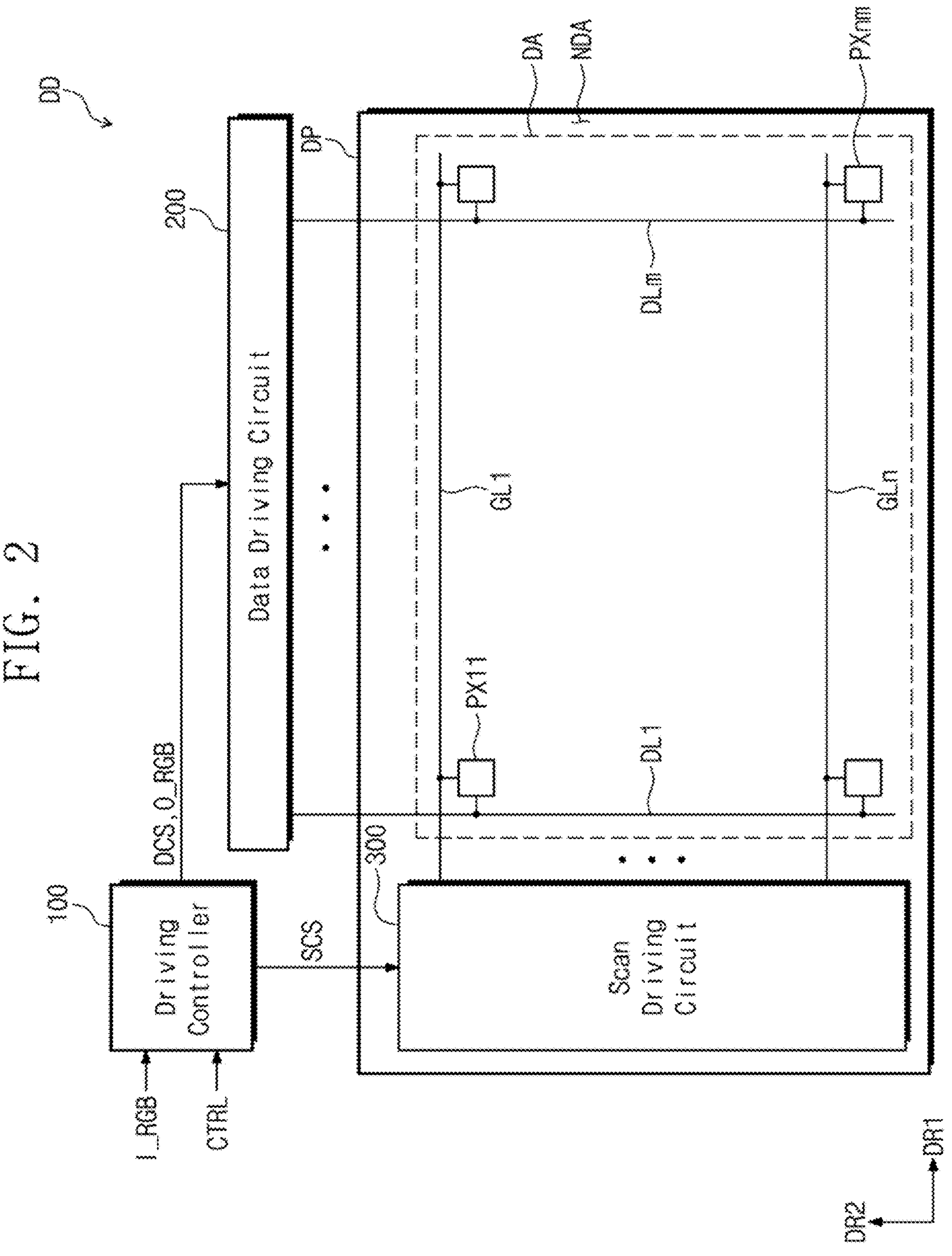
FIG. 2 is a perspective view of a display device, according to an embodiment of the present disclosure.

FIG. 2 is a block diagram of a display device according to an embodiment of the present disclosure.

Referring to FIG. 2, the display device DD includes a driving controller 100, a data driving circuit 200, and a display panel DP.

The driving controller 100 may be a control circuit/chip configured to receive an input image signal I_RGB and a control signal CTRL. The driving controller 100 generates an output image signal O_RGB by converting a data format of the input image signal I_RGB to be appropriate to the interface specification of the data driving circuit 200. The driving controller 100 outputs a scan control signal SCS and a data control signal DCS.

The data driving circuit 200 receives the data control signal DCS and the output image signal O_RGB from the driving controller 100. The data driving circuit 200 converts the output image signal O_RGB into data signals and then outputs the data signals to a plurality of data lines DL1 to DLm to be described later. The data signals refer to analog voltages corresponding to grayscale levels of the output image signal O_RGB.

According to an embodiment of the present disclosure, the display panel DP may include an emissive display panel. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot and a quantum rod. Hereinafter, the display panel DP according to the present embodiment will be referred to as the organic light emitting display panel.

The display panel DP includes scan lines GL1 to GLn, the data lines DL1 to DLm, and pixels PX11 to PXnm. The display panel DP may further include a scan driving circuit 300. The scan lines GL1 to GLn extend in the first direction DR1 from the scan driving circuit 300. According to an embodiment, the scan driving circuit 300 may be disposed at one side of the display panel DP, but the present disclosure is not necessarily limited thereto.

The driving controller 100, the data driving circuit 200, and the scan driving circuit 300 are driving circuits which are configured to provide data signals, which correspond to the input image signal I_RGB of the display panel DP, to the pixels PX11 to PXnm.

The pixels PX11 to PXnm may be disposed in the display area DA of the display panel DP, and the scan driving circuit 300 may be disposed in the non-display area NDA of the display panel DP.

The scan lines GL1 to GLn may extend in the first direction DR1 from the scan driving circuit 300, and may be spaced apart from each other in the second direction DR2. The data lines DL1 to DLm may extend in a direction opposite to the second direction DR2 from the data driving circuit 200, and may be spaced apart from each other in the first direction DR1.

Each of the pixels PX11 to PXnm may be connected to a relevant scan line of the scan lines GL1 to GLn, and a relevant data line of the data lines DL1 to DLm. Although FIG. 2 illustrates that each of the pixels PX11 to PXnm is connected to one scan line, the present disclosure is not necessarily limited thereto. Each of the pixels PX11 to PXnm may be electrically connected to two scan lines.

Each of the pixels PX11 to PXnm may include a light emitting device and a pixel circuit unit to control a light emitting operation of the light emitting device. According to an embodiment, a light emitting device may be an organic light emitting diode. However, the present disclosure is not necessarily limited thereto.

The scan driving circuit 300 receives the scan control signal SCS from the driving controller 100. The scan driving circuit 300 may output scan signals to the scan lines GL1 to GLn, in response to the scan control signal SCS. According to an embodiment, the scan driving circuit 300 may be formed in the same process as that of the pixel circuit unit included in the pixel FIG. 3 is a block diagram illustrating a configuration of the driving controller 100 according to an embodiment of the present disclosure.

Figure 3:
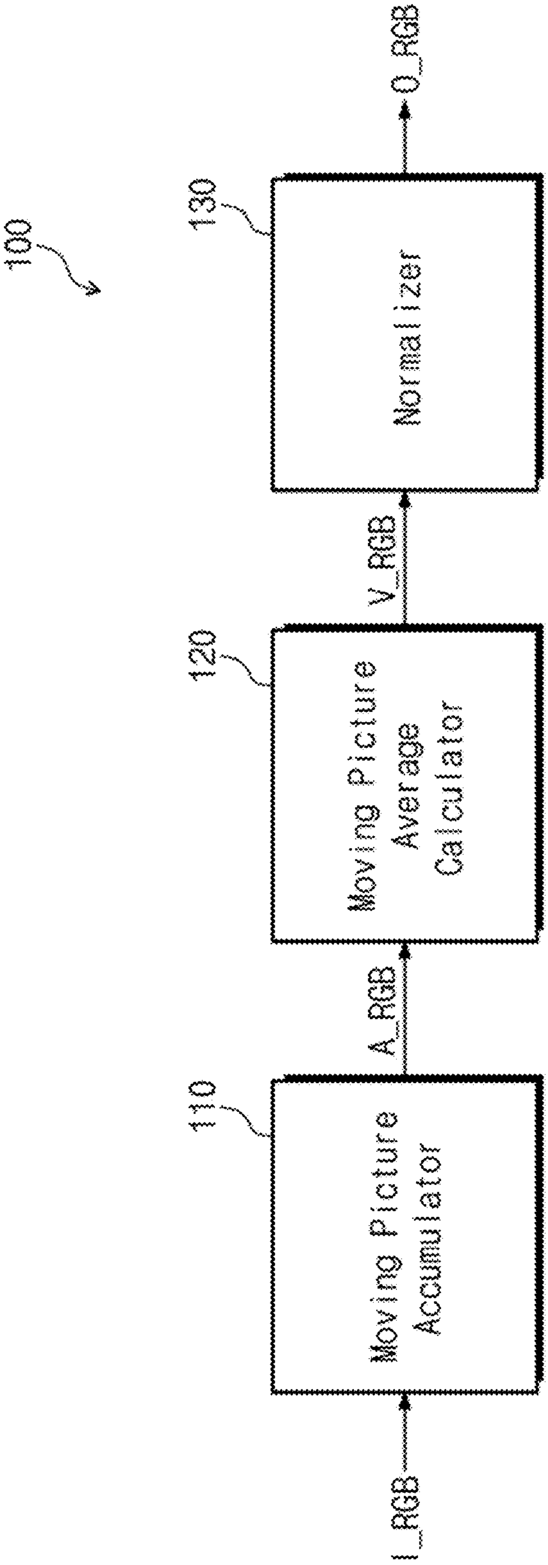
FIG. 3 is a block diagram illustrating the configuration of a driving controller, according to an embodiment of the present disclosure.

Referring to FIG. 3, the driving controller 100 includes a moving picture accumulator 110, a moving picture average calculator 120, and a normalizer 130. Each of the moving picture accumulator 110, the moving picture average calculator 120, and the normalizer 130 may be embodied as a circuit or chip including circuitry for performing the designated task. However, one or more of these elements may be combined within a single circuit or chip including circuitry for performing multiple tasks.

The moving picture accumulator 110 receives an input image signal I_RGB from the outside (e.g., an application processor, a graphics card, or a host processor). The input image signal I_RGB may be a moving picture signal. The moving picture accumulator 110 may be referred to as an accumulator which accumulates the input image signal I_RGB for an accumulating time.

The moving picture accumulator 110 accumulates the input image signal I_RGB for the accumulating time (for example, 24 hours) and outputs an accumulation image signal A_RGB. According to an embodiment, the moving picture accumulator 110 may allow the input image signals I_RGB to correspond to each of the pixels PX11 to PXnm and accumulate the input image signals I_RGB for each of the pixels PX11 to PXnm. According to an embodiment, the moving picture accumulator 110 may accumulate the input image signal I_RGB for a 24 hour period.

The moving picture average calculator 120 receives the accumulation image signal A_RGB and outputs an average image signal V_RGB for each of the pixels PX11 to PXnm. The average image signal V_RGB may be a value obtained by dividing the accumulation image signal A_RGB by the accumulating time (for example, 24 hours). The moving picture average calculator 120 may be referred to as an average calculator which outputs the average image signal V_RGB by dividing the accumulation image signal A_RGB by the accumulating time.

FIGS. 4A to 4D are views illustrating the input image signal I_RGB.

FIGS. 4A to 4D illustrate an input image signal I_RGB corresponding to 2×2 pixels in each of the first to fourth frames F1, F2, F3, and F4. The input image signal I_RGB may include 2×2 pixels, for example, image signals RGB11, RGB12, RGB21, and RGB22 corresponding to the four pixels. Each of the image signals RGB11, RGB12, RGB21, and RGB22 may correspond to any one of grayscale levels ranging from '0' to '255'.

Figure 4A:
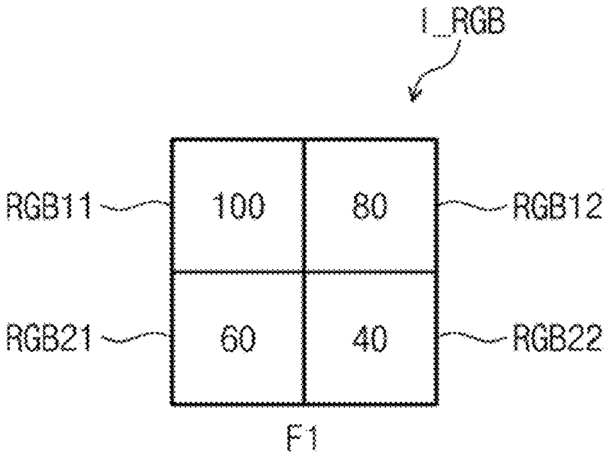
FIGS. 4A to 4D are views illustrating an image signal.
Figure 4B:
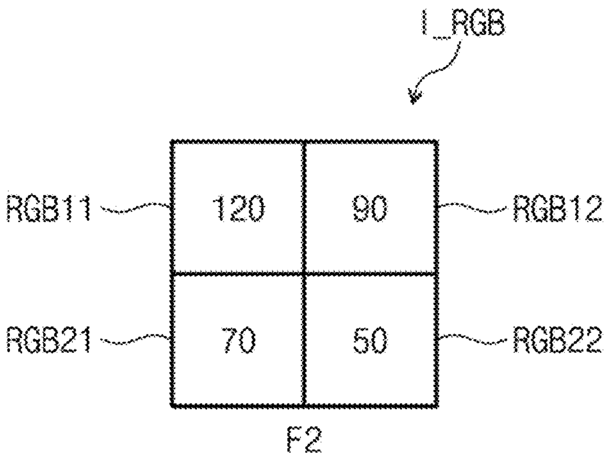
Figure 4C:
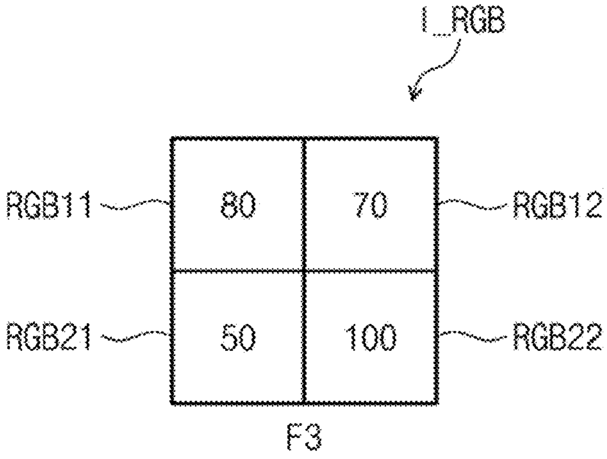
Figure 4D:
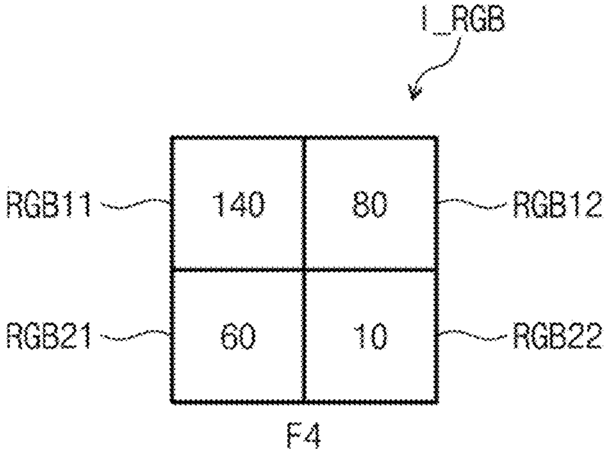

As illustrated in FIG. 4A, grayscale levels of the image signals RGB11, RGB12, RGB21, and RGB22 in the first frame F1 may be 100, 80, 60, and 40, respectively. The grayscale levels of the image signals RGB11, RGB12, RGB21, and RGB22 in the second frame F2 may be 120, 90, 70, and 50, respectively. The grayscale levels of the image signals RGB11, RGB12, RGB21, and RGB22 may be 80, 70, 50, and 100, respectively, in the third frame F3. The grayscale levels of the image signals RGB11, RGB12, RGB21, and RGB22 may be 140, 80, 60, and 10, respectively, in the fourth frame F4.

Figure 5:
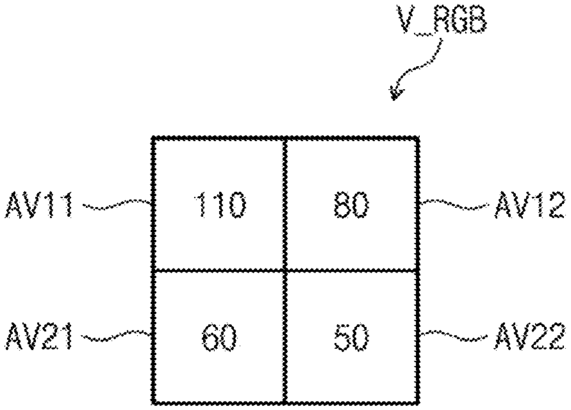
FIG. 5 is a view illustrating an average image signal for an input image signal illustrated in FIGS. 4A to 4D.

FIG. 5 illustrates the average image signal V_RGB for the input image signals I_RGB illustrated in FIGS. 4A to 4D.

Referring to FIGS. 3 and 5, the moving picture average calculator 120 calculates an average of the input image signals I_RGB for the first to fourth frames F1, F2, F3, and F4, and outputs the average image signal V_RGB.

For example, the moving picture average calculator 120 may calculate '110', which is an average of the image signals RGB11 having grayscale levels of 100', '120', '80', and '140' and input in the first to fourth frames F1, F2, F3, and F4, as the average AV11. The moving picture average calculator 120 may calculate '80', which is an average of the image signals RGB12 having grayscale levels of '80', '90', '70', and '80' and input in the first to fourth frames F1, F2, F3, and F4, as the average AV12. The moving picture average calculator 120 may calculate an average AV21 of the image signals RGB21 having grayscale levels of '60', '70', '50', and '60', and input in the first to fourth frames F1, F2, F3, and F4, to obtain '60'. The moving picture average calculator 120 may calculate an average AV22 of the image signals RGB22 having grayscale levels of '40', '50', '100', and '10' and input in the first to fourth frames F1, F2, F3, and F4, to obtain '50'. The average image signal V_RGB output from the moving picture average calculator 120 may include the averages AV11, AV12, AV21, and AV22. According to an embodiment illustrated in FIG. 5, the averages AV11, AV12, AV21, and AV22 may correspond to grayscale levels 110, 80, 60, and 50, respectively.

Although FIG. 5 illustrates the average image signal V_RGB obtained by calculating averages of the input image signals I_RGB corresponding to 2×2 pixels in the first to fourth frames F1, F2, F3, and F4, the present disclosure is not necessarily limited thereto. According to an embodiment, when an input image signal I_RGB corresponding to all pixels PX11 to PXnm of the display panel DP is input for a 24 hour period, the moving picture average calculator 120 may calculate an average of the accumulation image signal A_RGB accumulated for a 24 hour period and output the average image signal V_RGB.

Figure 6A:
FIG. 6A is a view illustrating an image based on an input image signal.

FIG. 6A is a view illustrating an image IMG1 based on an input image signal I_RGB.

Referring to FIGS. 2, 3, and 6A, the image IMG1 is an image displayed on the display panel DP, when the input image signal I_RGB, which indicates a moving picture, is provided to the data driving circuit 200 as the output image signal O_RGB. The image IMG1 indicates an image of a specific frame during a 24 hour period.

Figure 6B:
FIG. 6B is a view illustrating an image based on an average image signal.

FIG. 6B is a view illustrating an image IMG2 based on an average image signal V_RGB.

Referring to FIGS. 2, 3, and 6B, the image IMG2 is an image displayed on the display panel DP, when the average image signal V_RGB output from the moving picture average calculator 120 is provided to the data driving circuit 200 as the output image signal O_RGB.

According to an embodiment, the driving controller 100 may provide the average image signal V_RGB corresponding to the image IMG2 as the output image signal O_RGB for a predetermined time to determine whether an image sticking resulting from the pixels PX11 to PXnm of the display panel DP is made.

However, the time (e.g., 8,200 hours) may be required to inspect an image sticking by using the average image signal V_RGB corresponding to the image IMG2. For example, only when the output image signal O_RGB corresponding to the average image signal V_RGB is provided to the display panel DP for a long time (8,200 hours) or more, the image sticking resulting from degradation of the pixels PX11 to PXnm of the display panel DP may be detected. For example, when the average image signal V_RGB is provided to the display panel DP for 8,200 hours, the probability of image sticking degraded in pixels PX11 to PXnm of the display panel DP is about 10%.

To inspect the pixels PX11 to PXnm of the display panel DP for degradation, a process for inspecting an image sticking based on a moving picture is required. However, the process for inspecting the image sticking based on the moving picture may require significant time.

Referring back to FIG. 3 again, the normalizer 130 receives the average image signal V_RGB and outputs the output image signal O_RGB.

Figure 7A:
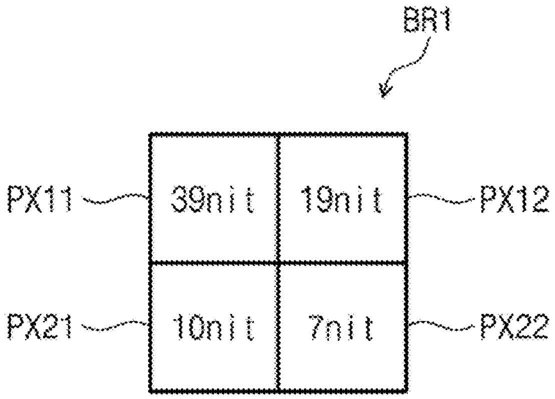
FIGS. 7A to 7C are views illustrating an operation of a normalizer.
Figure 7B:
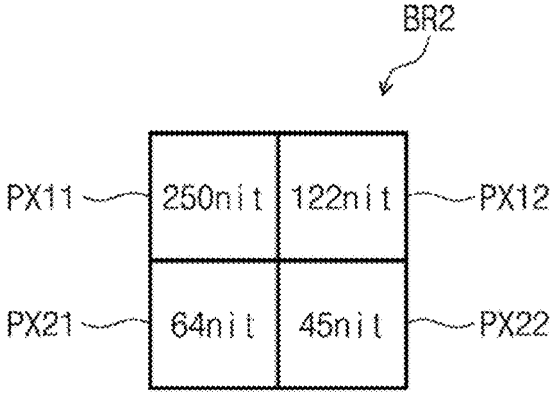
Figure 7C:
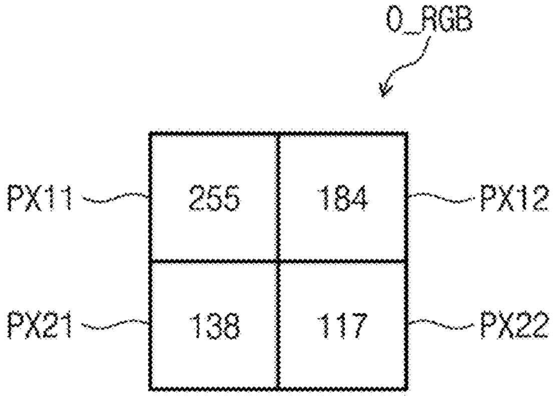

FIGS. 7A to 7C are views illustrating an operation of the normalizer 130.

FIG. 7A is a view illustrating brightness BR1 of an image displayed on the display panel DP, when the output image signal O_RGB corresponding to the average image signal V_RGB illustrated in FIG. 5 is provided to the data driving circuit 200. The brightness BR1 of the image illustrated in FIG. 7A may correspond to brightness of some pixels of the image IMG2 illustrated in FIG. 6B. When the averages AV11, AV12, AV21, and AV22 included in the average image signal V_RGB correspond to the grayscale levels of '110', '80', '60', and '50', the brightness of the pixels PX11, PX12, PX21, and PX22 may be 39 nits, 19 nits, 10 nits, and 7 nits.

FIG. 7B is a view illustrating a conversion brightness BR2 of the pixels PX11, PX12, PX21, and PX22 illustrated in FIG. 7A, when the brightness BR1 of the pixels PX11, PX12, PX21, and PX22 is converted based on the maximum reference brightness of the display panel DP.

According to an embodiment, it may be assumed that the maximum reference brightness of the display panel DP is 250 nits. The maximum reference brightness of the display panel DP may vary depending on characteristics of the display device DD.

The brightness of a pixel having the highest brightness among the pixels PX11, PX12, PX21, and PX22 may be converted to the maximum reference brightness of the display panel DP, and the brightness of the remaining pixels may be converted using the conversion ratio.

As illustrated in FIG. 7A, the brightness of the pixel PX11 among the pixels PX11, PX12, PX21, and PX22 is 39 nits which is higher than other pixels PX12, PX21, and PX2. Accordingly, the brightness of the pixel PX11 may be converted to the maximum reference rightness. The normalizer 130 converts the brightness of the pixel PX11 from 39 nits to 250 nits.

The normalizer 130 calculates a brightness conversion ratio of the pixel PX11. The brightness conversion ratio is a value by dividing the brightness of the pixel PX11 by the maximum reference brightness, and the brightness conversion ratio is 250/39 according to an embodiment.

The normalizer 130 may convert the brightness of the remaining pixels PX12, PX21, and PX22 based on the brightness conversion ratio (250/39) of the pixel PX11.

For example, since the brightness of the pixel PX12 illustrated in FIG. 7A is 19 nits, the conversion brightness of the pixel PX12 is '19×250/39', for example, about 122 nits.

Since the brightness of the pixel PX21 illustrated in FIG. 7A is 10 nits, the conversion brightness of the pixel PX21 is '10×250/39', for example, about 64 nits.

Since the brightness of the pixel PX22 illustrated in FIG. 7A is 7 nits, the conversion brightness of the pixel PX22 is '7×250/39', for example, about 45 nits.

FIG. 7C illustrates an output image signal O_RGB obtained by converting the conversion brightness BR2 of the pixels PX11, PX12, PX21, and PX22 illustrated in FIG. 7B to a grayscale level.

The conversion brightness BR2 of the pixels PX11, PX12, PX21, and PX22 illustrated in FIG. 7B may be converted to a grayscale level based on a 2.2 gamma curve.

The brightness of the pixel PX11 illustrated in FIG. 7B is 250 nits which is the maximum reference brightness of the display panel DP. The brightness of 250 nits may be converted to '255' which is the maximum grayscale level of the output image signal O_RGB.

A brightness of 122 nits, which is the brightness of the pixel PX12 illustrated in FIG. 7B, may be converted to a grayscale level of '184', based on a 2.2 gamma curve.

A brightness of 64 nits, which is the brightness of the pixel PX21 illustrated in FIG. 7B, may be converted to a grayscale level of '138,' based on the 2.2 gamma curve.

A brightness of 45 nits, which is the brightness of the pixel PX22 illustrated in FIG. 7B, may be converted to a grayscale level of '117' based on the 2.2 gamma curve.

As described above, the grayscale level of each of the pixels PX11, PX12, PX21, and PX22 may correspond to any one of the grayscale levels ranging from '0' to '255' depending on the conversion brightness BR2.

The normalizer 130 illustrated in FIG. 3 outputs the output image signal O_RGB corresponding to the pixels PX11, PX12, PX21, and PX22 illustrated in FIG. 7C. The output image signal O_RGB may be provided to the display panel DP through the data driving circuit 200 illustrated in FIG. 2.

When comparing the average image signal V_RGB illustrated in FIG. 5 with the output image signal O_RGB illustrated in FIG. 7C, '110', '80', '60', and '50' of the average image signal V_RGB corresponding to the pixels PX11, PX12, PX21, and PX22 may be converted into '255', '184', '138', and '117' of the output image signal O_RGB and may be provided to the display panel DP.

When the average image signal V_RGB for the input image signal I_RGB is provided to the display panel DP, a first time (referred to as T1) is required for evaluating an image sticking.

When the average image signal V_RGB is normalized based on the maximum reference brightness of the display panel DP and the output image signal O_RGB is provided to the display panel DP, a second time (referred to as T2) is required for evaluating an image sticking. The second time (T2) may be a value smaller than the first time (T1).

The second time (T2) may be calculated using an acceleration coefficient AC, and the acceleration coefficient AC may be calculated by the following Equation 1.

$$AC = \left(\frac{\text{Brightness of average image signal}}{\text{Maximum reference brightness}}\right)^{AA} = \left(\frac{77.9}{230}\right) - 1.5 = 3.74 \qquad \text{[Equation 1]}$$

In Equation 1, 'AA' is the brightness acceleration index. The brightness acceleration index may be determined based on characteristics of the display panel DP. According to an embodiment, the maximum reference brightness is the maximum brightness allowed by the display panel DP. It may be assumed that the brightness of the image IMG2 based on the average image signal V_RGB illustrated in FIG. 6B is '77.9'. According to an embodiment, '77.9', which is the brightness of the image IMG2, may be the average brightness of the entire portion of the image IMG2 illustrated in FIG. 6B. According to an embodiment, the brightness acceleration index AA is −1.5.

For example, when the first time (T1) is 8,200 hours, the second time (T2) based on the acceleration coefficient AC calculated by Equation 1 is 8,200/5.74 hours, for example, about 1,429 hours.

When the output image signal O_RGB (illustrated in FIG. 7C) obtained by normalizing the average image signal V_RGB based on the maximum reference brightness of the display panel DP is provided to the display panel DP, the second time (T2), which is about 1,429 hours, is required for inspecting an image sticking. This is a value significantly less than the first time (T1), for example, 8,200 hours required when the average image signal V_RGB (illustrated in FIG. 5) is provided to the display panel DP.

According to an embodiment, the normalizer 130 may continuously provide the output image signal O_RGB (illustrated in FIG. 7C), which is obtained by normalizing the average image signal V_RGB based on the maximum reference brightness of the display panel DP, to the display panel DP for about 1,429 hours to inspect the image sticking of the display panel Dp.

According to an embodiment, the average image signal V_RGB illustrated in FIG. 5 and the output image signal O_RGB illustrated in FIG. 7C may be alternately provided to the display panel DP to evaluate the image sticking of the display panel DP. For example, the average image signal V_RGB illustrated in FIG. 5 and the output image signal O_RGB illustrated in FIG. 7C may be alternately provided to the display panel DP every 24 hours.

When the maximum brightness, for example, the maximum reference brightness allowed by the display panel DP is increased, the acceleration coefficient AC increases. For example, when the maximum reference brightness of the display panel DP is increased during the evaluating of the image sticking, the second time (T2) required for evaluating the image sticking may be decreased.

Figure 8:
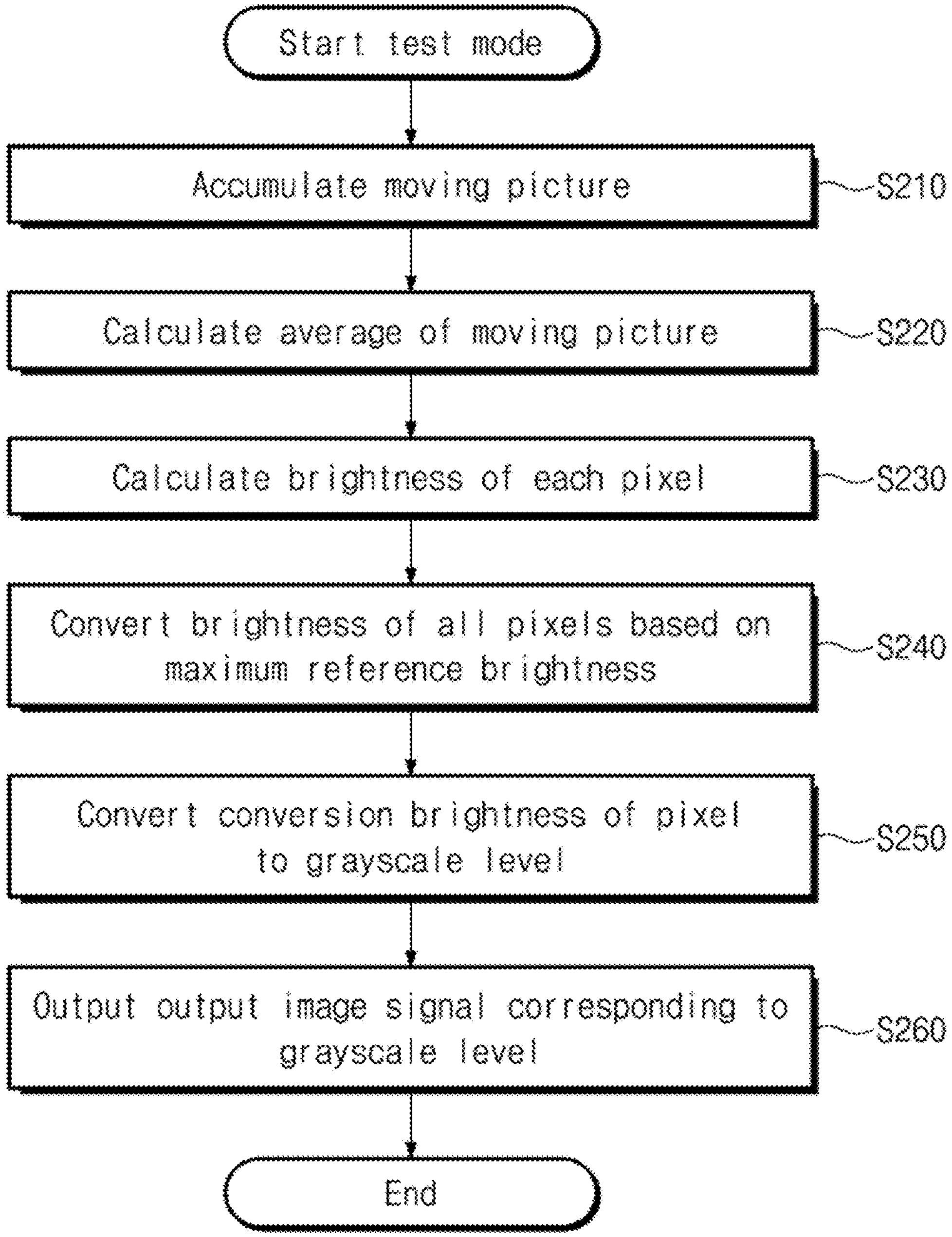
FIG. 8 is a flowchart illustrating a method for operating a display device.

FIG. 8 is a flowchart of a method for operating a display device.

In the following description, the operation of the display device will be described by making reference to the driving controller made with reference to FIGS. 2 and 3, but the present disclosure is not necessarily limited thereto Referring to FIGS. 2, 3, and 8, the moving picture accumulator 110 of the driving controller 100 receives the input image signal I_RGB. The moving picture accumulator 110 may accumulate the input image signal I_RGB, which is a moving picture signal, for an accumulating time, for example, 24 hours, and may output the accumulation image signal A_RGB (step S210).

The moving picture average calculator 120 receives the accumulation image signal A_RGB and calculates an average of the moving picture, for example, an average of the accumulation image A_RGB for the pixels PX11 to PXnm (step S220). The moving picture average calculator 120 may output an average image signal V_RGB which is an average of the accumulation image signal A_RGB for the pixels PX11 to PXnm. According to an embodiment, the average image signal V_RGB may be a value obtained by dividing the accumulation image signal A_RGB by the accumulating time (for example, 24 hours).

The normalizer 130 calculates brightness, which corresponds to the average image signal V_RGB, of each of the pixels PX11 to PXnm (step S230). According to an embodiment, the normalizer 130 may calculate the brightness BR1 illustrated in FIG. 7A from the average image signal V_RGB illustrated in FIG. 5.

The normalizer 130 calculates a conversion brightness obtained by converting the brightness of each of the pixels PX11 to PXnm based on the maximum reference brightness of the display panel DP (step S240). According to an embodiment, the normalizer 130 may calculate the conversion brightness BR2 illustrated in FIG. 7B from the brightness BR1 illustrated in FIG. 7A.

According to an embodiment, the normalizer 130 may convert the brightness of a pixel, which has the highest brightness, among the pixels PX11, PX12, PX21, and PX22 to the maximum reference brightness of the display panel DP, and may convert the brightness of the remaining pixels using the conversion ratio based on the maximum reference brightness.

As in illustrated in FIG. 7A, the pixel PX11 among the pixels PX11, PX12, PX21, and PX22 has the highest brightness of 39 nits, when compared to the brightness of other pixels PX12, PX21, and PX22. Accordingly, the brightness of the pixel PX11 may be converted to the maximum reference brightness.

The normalizer 130 calculates a brightness conversion ratio of the pixel PX11. The brightness conversion ratio is (the maximum reference brightness)/(pixel brightness)), and '250/39' as illustrated in FIGS. 7A and 7B.

The normalizer 130 may calculate the conversion brightness obtained by converting the brightness of the remaining pixels PX12, PX21, and PX22, based on '250/39' which is the brightness conversion ratio of the pixel PX11. In the same manner, the conversion brightness of each of the pixels PX11 to PXnm illustrated in FIG. 2 may be calculated.

The normalizer 130 converts the conversion brightness of each of the pixels PX11 to PXnm into a relevant grayscale level (step S250). According to an embodiment, the normalizer 130 may convert the conversion brightness of each of the pixels PX11 to PXnm to the relevant gradation level based on a 2.2 gamma curve. According to an embodiment, the normalizer 130 may convert the conversion brightness BR2 illustrated in FIG. 7B to the grayscale level illustrated in FIG. 7C.

The normalizer 130 may output a grayscale level of each of the pixels PX11 to PXnm as the output image signal O_RGB. The output image signal O_RGB may be provided to the display panel DP through the data driving circuit 200.

According to an embodiment, the normalizer 130 may continuously provide the output image signal O_RGB (illustrated in FIG. 7C), which is obtained by normalizing the average image signal V_RGB based on the maximum reference brightness of the display panel DP, to the display panel DP for a predetermined time for evaluating an image sticking of the display panel DP.

As the output image signal O_RGB, which is obtained by normalizing the average image signal V_RGB based on the maximum reference brightness of the display panel DP, is provided to the display panel DP to evaluate an image sticking of the display panel DP, the test time required to evaluate the image sticking may be reduced.

As described above, the display device having the above configuration may evaluate the image sticking of the display panel by using the moving picture. For example, as the brightness of the moving picture is increased, based on the highest brightness of brightness of the moving pictures, the time for evaluating the image sticking may be reduced. Accordingly, the time and costs for producing the display device may be reduced.

Although an embodiment of the present disclosure has been described for illustrative purposes, those skilled in the art will appreciate that various modifications, and substitutions are possible, without departing from the scope and spirit of the invention as disclosed in the accompanying claims. Accordingly, the technical scope of the present disclosure is not necessarily limited to the detailed description of this specification.

While the present disclosure has been described with reference to embodiments thereof, it will be apparent to those of ordinary skill in the art that various changes and modifications may be made thereto without departing from the spirit and scope of the present disclosure.

What is claimed is:

1. A display device, comprising:

a driving controller configured to receive an input image signal and to output an output image signal;

a data driving circuit configured to output a data signal corresponding to the output image signal; and a display panel including a plurality of pixels and configured to display an image corresponding to the data signal, wherein the driving controller includes:

a moving picture accumulator configured to receive the input image signal and to output an accumulation image signal obtained by accumulating the input image signal for an accumulating time;

a moving picture average calculator configured to output an average image signal by dividing the accumulation image signal by the accumulating time; and a normalizer configured to output the output image signal by normalizing the average image signal, based on a maximum reference brightness of the display panel.

2. The display device of claim 1, wherein the moving picture accumulator is configured to accumulate the input image signal for each of the plurality of pixels and to output the accumulation image signal for each of the plurality of pixels.

3. The display device of claim 2, wherein the moving picture average calculator is configured to output the average image signal for each of the plurality of pixels.

4. The display device of claim 3, wherein the normalizer is configured to calculate brightness, which corresponds to the average image signal, of each of the plurality of pixels, to convert, to conversion brightness, the brightness of each of the plurality of pixels, based on the maximum reference brightness of the display panel, and to convert the conversion brightness of each of the plurality of pixels to a grayscale level to output the output image signal.

5. The display device of claim 4, wherein the normalizer is configured to set the conversion brightness of a pixel, which has highest brightness, of the plurality of pixels to the maximum reference brightness, calculate a brightness conversion ratio of the pixel, which has the highest brightness, of the plurality of pixels, and convert, to the conversion brightness, the brightness of each of the plurality of pixels, by calculating the conversion brightness of each of remaining pixels of the plurality of pixels, based on the brightness conversion ratio of the pixel.

6. The display device of claim 5, wherein the brightness conversion ratio is obtained by dividing the maximum reference brightness by the brightness of the pixel having the highest brightness.

7. The display device of claim 5, wherein the conversion brightness of each of the remaining pixels of the plurality of pixels is obtained by multiplying the brightness of each of the remaining pixels by the brightness conversion ratio.

8. The display device of claim 4, wherein the normalizer is configured to convert the conversion brightness of each of the plurality of pixels to the grayscale level, based on a 2.2 gamma curve.

9. The display device of claim 4, wherein a grayscale level of a pixel, which has the conversion brightness set to the maximum reference brightness, of the plurality of pixels is '255'.

10. The display device of claim 3, wherein the moving picture accumulator is configured to accumulate the input image signal for each of the plurality of pixels for a 24 hour period, and output the accumulation image signal for each of the plurality of pixels.

11. The display device of claim 1, wherein the driving controller is configured to output the obtained output image signal as the normalizer normalizes the average image signal based on the maximum reference brightness of the display panel, for a predetermined time.

12. A method for operating a display device, the method comprising:

receiving an input image signal;

accumulating the input image signal for an accumulating time;

outputting an accumulation image signal based on the accumulated input image signal;

outputting an average image signal by dividing the accumulation image signal by the accumulating time; and outputting an output image signal by normalizing the average image signal based on a maximum reference brightness of a display panel of the display device.

13. The method of claim 12, wherein the display panel includes a plurality of pixels, and wherein the accumulating of the input image signal includes:

accumulating the input image signal for each of the plurality of pixels; and outputting the accumulation image signal for each of the plurality of pixels.

14. The method of claim 13, wherein the outputting of the average image signal includes:

outputting the average image signal for each of the plurality of pixels.

15. The method of claim 14, wherein the outputting the output image signal includes:

calculating a brightness, which corresponds to the average image signal, of each of the plurality of pixels;

converting, to a conversion brightness, the brightness of each of the plurality of pixels, based on the maximum reference brightness of the display panel; and converting the conversion brightness of each of the plurality of pixels to a grayscale level and outputting the output image signal using the grayscale level.

16. The method of claim 15, wherein the converting of the brightness of each of the plurality of pixels to the conversion brightness includes:

setting the conversion brightness of a pixel, which has highest brightness, of the plurality of pixels to the maximum reference brightness;

calculating a brightness conversion ratio of the pixel, which has the highest brightness, of the plurality of pixels; and calculating the conversion brightness of each of remaining pixels of the plurality of pixels, based on the brightness conversion ratio.

17. The method of claim 16, wherein the brightness conversion ratio is obtained by dividing the maximum reference brightness by the brightness of the pixel having the highest brightness.

18. The method of claim 17, wherein the conversion brightness of each of the remaining pixels of the plurality of pixels is obtained by multiplying the brightness of each of the remaining pixels by the brightness conversion ratio.

19. The method of claim 15, wherein the outputting of the output image signal includes:

converting the conversion brightness of each of the plurality of pixels to the grayscale level, based on a 2.2 gamma curve.

20. The method of claim 13, wherein the accumulating of the input image signal includes:

accumulating the input image signal for each of the plurality of pixels for a 24 hour period; and outputting the accumulation image signal for each of the plurality of pixels.

* * * * *